(12) United States Patent
Yin

(10) Patent No.: US 7,184,367 B2
(45) Date of Patent: Feb. 27, 2007

(54) METHOD TO CONVERT SEISMIC TRACES INTO PETROPHYSICAL PROPERTY LOGS

(75) Inventor: Hezhu Yin, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/523,124

(22) PCT Filed: Feb. 13, 2004

(86) PCT No.: PCT/US2004/004313

§ 371 (c)(1),
(2), (4) Date: Sep. 20, 2005

(87) PCT Pub. No.: WO2004/095072

PCT Pub. Date: Nov. 4, 2004

(65) Prior Publication Data

US 2006/0155475 A1    Jul. 13, 2006

Related U.S. Application Data

(60) Provisional application No. 60/458,093, filed on Mar. 27, 2003.

(51) Int. Cl.
*G01V 1/00* (2006.01)
(52) U.S. Cl. .............................. 367/38; 702/14; 702/17
(58) Field of Classification Search .................. 367/38; 357/38; 702/14, 17
See application file for complete search history.

(56) References Cited

U.S. PATENT DOCUMENTS

| | | | |
|---|---|---|---|
| 4,679,174 A | 7/1987 | Gelfand | 367/73 |
| 5,444,619 A | 8/1995 | Hoskins et al. | 364/421 |
| 5,706,194 A | 1/1998 | Neff et al. | 364/421 |
| 5,835,883 A | 11/1998 | Neff et al. | 364/421 |
| 6,374,185 B1 | 4/2002 | Taner et al. | 702/6 |

OTHER PUBLICATIONS

King et al, Simultaneous Measurement of Material Characteristics of Layered Structures by a Single Acoustic Interrogation, Dec. 1993, IEEE, vol. 42., No. 6, pp. 976-982.*
Simaan et al, Estimation of texture orientation in seismic images using neural network, Jun. 1999, Geoscience and Remote Sensing Symposium, pp. 1372-1374.*

(Continued)

*Primary Examiner*—Mark Hellner
(74) *Attorney, Agent, or Firm*—ExxonMobil Upstream Research Company Law Dept.

(57) ABSTRACT

A method to convert seismic traces to petrophysical properties is disclosed. One embodiment of the method comprises (a) deriving a combined log seismic response from at least one petrophysical log from a well and at least one seismic trace substantially near the well, (b) convolving the combined log seismic response filter with each seismic trace to convert the seismic traces to logs of petrophysical properties, (c) outputting the petrophysical properties. Equations to derive the combined log seismic response and to convolve the combined seismic response filter are disclosed. The method may be used to output the petrophysical data as a two-dimensional cross-section or as a three-dimensional volume cube.

15 Claims, 3 Drawing Sheets

OTHER PUBLICATIONS

Karaam et al, Efficient Design of Digital Filters for 2-D and 3-D Depth Migration, Apr. 1997, IEE Transactions on Signal Processing, vol. 45, No. 4, pp. 1036-1044.*

Aki and Richards (1980) "Quantitative Seismology", Freeman and Co.

Claerbout, J.F. (1986) "Simultaneous pre-normal moveout and post-normal moveout deconvolution", *Geophysics*, 51, 1341-1354.

Constance, P.E. et al. (1999) "Simultaneously Acquisition of 3-D Surface Seismic Data and 3-C, 3-D VSP Data", *69th Ann. Internat. Mtg., SEG, Exp. Abs.*, 104-107.

Oldenburg, D.W. et al. (1981) "Wavelet estimation and deconvolution", *Geophysics*, 46, 1528-1542.

Robinson and Treitel (1980) "Geophysical Signal Analysis", *Prentice-Hall*.

Sheriff and Geldart (1995) *Exploration Seismology*, p. 295-299.

Treitel, S. et al. (1982) "Linear inverse theory and deconvolution", *Geophysics*, 1153-1159.

Versteeg, R. et al. (1991) "The Marmousi experience: Proceedings of the 1990 EAEG workshop on practical aspects of seismic data inversion", *52nd EAEG Meeting, Eur. Assn. Expl. Geophys.*

Yilmaz (1987) "Seismic Data Processing", *SEG Series on Investigations in Geophysics*, V2, p. 103.

Youn, O.K., and H. Zhou (2001) "Depth imaging with multiples", *Geophysics*, 66, 246-255.

Zhou et al. (2001) "Retrieval of high-resolution components by deterministic deconvolution: A field example", *71st Ann. Internat. Mtg., SEG, Exp. Abs.*

Ziolkowski, A. (1984) "Deconvolution", *International Human Resources Dev. Cor.*, 4 pgs.

* cited by examiner

METHOD TO CONVERT SEISMIC TRACES INTO PETROPHYSICAL PROPERTY LOGS

This application is the National Stage of International Application No. PCT/US04/04313, filed Feb. 13, 2004, which claims the benefit of U.S. Provisional Patent Application No. 60/458,093, filed Mar. 27, 2003.

FIELD OF THE INVENTION

This invention relates generally to the field of reservoir characterization using petrophysical properties. More specifically, this invention relates to deriving petrophysical property data with seismic data as constraints.

BACKGROUND

Reservoir characterization is a process of using well log and seismic data to map reservoir geometry, net-to-gross ratio, porosity, water saturation, permeability, and other petrophysical properties. Each seismic response trace is the result of a seismic source wavelet convoluted with a spatial earth reflectivity series, if linear, and is not a direct indicator of rock and fluid properties. Well logs with much higher vertical resolution than seismic traces, such as Gamma Ray, Density, Porosity, Sonic velocity, Resistivity etc. measured from borehole can be direct indicators of rock and fluid properties after some borehole environmental corrections.

The number of wells drilled in a reservoir is always limited because of well cost and the thickness of many reservoir formations is often below seismic resolution. If wells were drilled in each location of the seismic trace (or each location of geophone), then logs would be obtained from these wells and the reservoir characterization would utilize the well logs to map reservoir geometry, net-to-gross ratio, porosity, water saturation, permeability, and other petrophysical properties. For economical reasons (or cost-effectiveness), there are rarely enough wells to properly map the details of reservoirs. Therefore, Petrophysical properties are inferred form the seismic data.

Until recently, seismic attributes were extracted and calibrated with available well control data, and petrophysical properties were interpolated/extrapolated between and beyond sparse well control. A set of seismic attributes related to time, amplitude and shape, including trace-to-trace time tracking cross correlation coefficient, integrated absolute amplitude, and area ratio of fatness, were calculated and extracted from reflection seismic trace(s). Interval attributes such as, the average of all positive peak amplitudes and integrated absolute amplitude are calibrated against petrophysical properties from well logs. Rock property maps can be generated utilizing these attributes at an interval average. Though many attributes can be generated from a seismic traces, how to classify and calibrate attributes with well data for best quantitative reservoir characterization and uncertainty analysis are continual subjects of research.

U.S. Pat. No. 5,444,619 (Hoskins et al.) uses a "Artificial Neural Networks (ANN's)" method to estimate the relationship of reservoir properties and seismic data. However, the confidence level of such prediction using statistical methods are often questioned and challenged due to lack of basic physical relationships between a seismic trace and petrophysical properties indicated by a set of logs. Another method for determining reservoir properties from seismic data is disclosed in U.S. Pat. No. 5,835,883 (Neff et al.) This method requires constructing pseudo well logs and synthetic seismic traces of the seismic and well log data to produce an estimate of the petrophysical properties. The model includes a matching scheme wherein trend curves of petrophysical properties are selected based on the match to the data. This process requires operator selection and selecting the wrong trend curve can lead to errors.

Accordingly, there is a need for an innovative method to directly convert seismic data to petrophysical property data. The methods preferably includes converting three-dimensional seismic data to petrophysical property cube(s) in either time or depth domain with enhanced vertical resolution. Embodiments of this invention satisfy these needs.

SUMMARY

A method to convert seismic traces to petrophysical properties is disclosed. The method comprises (a) deriving a Combined Log-Seismic Response (CLSR) filter from at least one petrophysical log from a well and at least one seismic trace near the well and (b) convolving the CLSR filter to convert each seismic trace to a "pseudo" petrophysical log.

A second embodiment of the method converts a three-dimensional seismic volume cube of an area to a three-dimensional petrophysical property volume cube. The method comprises (a) providing a three dimensional seismic volume cube from a seismic survey of the area, (b) providing at least one petrophysical log for the well in the area, (c) deriving at combined log seismic response filter from a log and at least one seismic trace near the well, (d) converting seismic wiggles traces to petrophysical properties by convolving the CLSR filter, (f) outputting the petrophysical properties as a three-dimensional property volume cube.

BRIEF DESCRIPTION OF THE DRAWINGS

FIG. 4(F) is the frequency spectrum of the low frequency seismic trace corresponding to the seismic trace in FIG. 4(G);

DETAILED DESCRIPTION

In the following detailed description, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims The present invention is an innovative method to convert a seismic trace to a petrophysical property log property and generate petrophysical property data including for example, three-dimensional cubes in either time or depth domain with enhanced vertical resolution up to log resolution. The method is based on rigorous wave physics and petrophysics principles.

Figure 1:
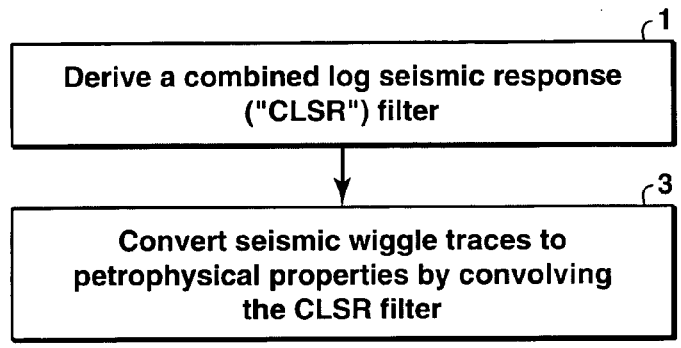
FIG. 1 is a flow chart illustration of one embodiment of a method to convert a seismic wiggles to petrophysical properties.

The high resolution petrophysical logs as traces corresponding to each surface seismic trace can be derived by convolution of a Combined Log-Seismic Response (CLSR) filter with each low resolution seismic trace. This allows generation of two-dimensional slices and three-dimensional volumes of petrophysical property data. As shown in FIG. 1, one embodiment of the invention includes two steps. First, a Combined Log-Seismic Response ("CLSR") filter is derived 1. The CLSR filter is derived from a petrophysical log and at least one seismic trace near the well. In the second step, the CLSR filter from the first step is convolved with each seismic trace to convert each seismic wiggle trace to petrophysical properties 3. Converting a cube of three-dimensional seismic volume traces will generate three-dimensional petrophysical property volume cubes.

In the seismic data, the high-frequency reflectivity information are usually filtered out due to the nature of the low-frequency seismic wavelet, and the high-frequency information cannot be brought back through conventional seismic processing. However, when both a high-resolution log and a low-resolution seismic trace are available at the same spatial location, a relationship can be determined between them. Then, the relationship, described below, may be used to extrapolate (predict) the high-resolution logs at a neighboring location where only the low-frequency seismic data are available. The extrapolation requires an assumption that the relationship is mathematically stable and does not vary spatially within the survey area or reservoir unit.

Following one embodiment of the convolution model, in time domain, a linear response of a low frequency seismic response $l_{seis}(t)$ and a high frequency well log response $h_{log}(t)$ may be expressed as the convolution of the low frequency seismic response filter $w_l(t)$ and high frequency logging tool response filter $w_h(t)$ with the petrophysical property series at the same spatial location as expressed in Equation (1) and (2).

A low frequency seismic response $l_{seis}(t)$ and a high frequency well log response $h_{log}(t)$ may be expressed as the convolution of the low frequency seismic response filter $w_l(t)$ and high frequency logging tool response filter $w_h(t)$. The petrophysical property series at the same spatial location may be expressed as Equations (1) and (2):

$$l_{seis}(t) = r(t) * w_l(t) \quad (1)$$

$$h_{log}(t) = x(t) * w_h(t) \quad (2)$$

where r(t) is the reflectivity of the formation at or near wellbore and x(t) is a petrophysical property log converted in time series for the well. Examples of petrophysical property logs include but are not limited to gamma ray log-GR(t), resistivity log-R(t), porosity log-PHI(t), density log-RHOB(t), or sonic log-DT(t) etc. from the well. Furthermore, "*" stands for convolution, $w_h(t)$ and $w_l(t)$ are high-resolution log response function and low-resolution seismic wavelets, respectively.

$h_{log}(t)$, $l_{seis}(t)$ $w_h(t)$, and $w_l(t)$ are respectively waveforms of logs and seismic traces and can be expressed as "relative" amplitude as a function of time (typically in milliseconds), and reflectivity r(t) is unitless. Typically the logs have the following units, GR is in API, Rt is in OHMM, PHI is in P.U., RHOB is in g/cm³, DT is in microsecond/ft.

In taking the ratio of Equations (1) and (2), the relationship between the log and seismic responses may be expressed as Equation (3):

$$h_{log}(t) = l_{seis}(t) * c(t) \quad (3)$$

where c(t) is the Combined Log-seismic Response (CLSR) filter, and may be expressed as $c(\omega) = W_h(\omega)/W_l(\omega)$ in frequency domain. $p_{log}(t)$ is the time domain response of a petrophysical log x(t) corresponding to the reflectivity series r(t) that is derived from density log-ROHB(t) and sonic log-DT(t), which can be expressed in frequency domain as $P_{log}(\omega) = X(\omega)/R(\omega)$. When solving for the high resolution acoustic reflectivity log, x(t) equals r(t), and then, $p_{log}(t)$ or goes to one. In the above, c(t) is represents a "seismic-petrophysics covariance" filter which combines the low-resolution seismic response with the high-resolution log response, namely, the Combined Log-Seismic Response (CLSR) filter.

In theory, c(t) can be solved by deterministic deconvolution (for example, $c(t) = h_{log}(t) * l_{seis}(t)^{-1}$. A stable c(t) from real data with a finite length may only be inverted if seismic response filter $w_l(t)$ has broad bandwidth and is inclusive of the logging tool response filter $w_h(t)$. There are methods that may be employed to broaden the $w_l(t)$ bandwidth and provide a stable c(t). For example, a pre-whitening technique includes superimposing an impulse response curve to a filter design but not to final data. (Sheriff and Geldart, 1995, Exploration Seismology, p. 295–299).

In order to construct a stable c(t), its denominator term $w_l(t)$ should be of broad bandwidth inclusive of the numerator term $w_h(t)$. However, $w_l(t)$ usually has little or no energy at high frequencies. Consequently, it would be unstable to determine c(t) in frequency domain by spectral division. Though pre-whitening has been effective in treating such deconvolution (Yilmaz, 1987, p. 103), it will introduce high-frequency noise harmful to the extrapolation and images. A practical method is to solve the deconvolution as a constrained inversion in time or depth domain where amplitude and phase information are treated simultaneously. Then the instability problem in deconvolution will become a non-uniqueness problem in the inversion.

The process in time domain can be carried out in two steps. In the first step, assume that over an area, the low-resolution seismic data were acquired at many locations: $\{l_{seis}(t)_j, j=1, 2, \ldots k \ldots\}$, and at the $k_{th}$ location, a well is drilled and high-resolution log response, say $l_{seis}(t)_k$ was taken near the $k_{th}$ seismic trace location. In the first step, the CLSR filter c(t) can be determined from:

$$c(t) = h_{log}(t)_k * l_{seis}(t)_k^{-1} \quad (4)$$

since both $l_{seis}(t)_k$ and $h_{log}(t)_k$ are known, the above is a deterministic process.

In the second step, assuming that c(t) is invariant over the seismic survey area or a sub-area, the high-resolution petrophysical property log responses $h'_{log}(t)_j$ from seismic trace j for all seismic traces $\{l_{seis}(t)_j, j=1, 2, \ldots k \ldots\}$ within the survey area, can be extrapolated (or predicted) using Equation 5.

$$h'_{log}(t)_j = l_{seis}(t)_j * c(t) \quad (5)$$

This is again a deterministic process because both terms in the right hand side of (5) are known. When the logging tool responses function $w_h(t)$ run in the wells in a seismic survey area, and the seismic wavelet $w_l(t)$ for the survey (such as an airgun for marine seismic survey) are invariant throughout the survey, the CLSR filter c(t) may also be invariant to satisfy the assumption. Otherwise, $h_{log}(t)$ the high-resolution log and $l_{seis}(t)$ the low-resolution seismic trace will not be self consistent. Self consistent is when both the logging tool responses function $w_h(t)$ run in the wells in a seismic survey area and the seismic wavelet $w_l(t)$ for the survey satisfy the invariant assumption. If the c(t) also satisfies the invariant assumption over the seismic survey area, then the high frequency well log response $h_{log}(t)$ and the low frequency seismic response $l_{seis}(t)$ may be called self (or internally) consistent.

As shown in FIG. 1, the second step requires convolution of the CLSR filter 3. There are three factors in this convolution. The three factors are seismic trace $l_{seis}(t)$, reflectivity r(t), and wavelet, $w_l(t)$ as shown in convolution Equations (1) and (2).

The CLSR filter c(t) may be solved by deconvolution as shown by Equation (4), and the conventional deconvolution has been focused on statistical estimation of two out of the three factors (or terms) involved in a convolution. (See, for example, Robinson and Treitel, 1980; Ziolkowski, A., 1984; Yilmaz, 1987). Similar to Extrapolation by Deterministic Deconvolution (EDD) (Zhou et al., 2001), the approach here can yield more robust results. The convolution process is solved as a constrained inversion and is described below.

The convolution Equation (3) can be represented in matrix-vector forms:

$$Gl = Lc = h, \quad (6)$$

where $l = (l_0, l_1, l_2, \ldots)^T$, $c = (c_0, c_1, c_2, \ldots)^T$, $h = (h_0, h_1, h_2, \ldots)^T$ are coefficient vectors of l(t), c(t), and h(t), respectively; the two matrices G and L consist of successions of down-shifted columns of c and l, respectively. C is solved in Equation 7, h is a high-resolution log that was measured in the wellbore, and l is a low-resolution seismic trace from the seismic data.

Applying Equation (4), the first step is to derive the CLSR filter, that is to invert c from the $k_{th}$ location with well logs with Equation (7):

$$L_k c = h_k. \quad (7)$$

The singular value decomposition of $L_k$ may be expressed as:

$$L_k = U \Lambda V^T, \quad (8)$$

where U and V are unitary matrices, and $\Lambda$ is the diagonal matrix containing singular values $\{s_i\}$. A unitary matrix has its Hermitian conjugate equal to its inverse, and a diagonal matrix has the form of $a_{ij}=1$ for all i=j, and $a_{ij}=0$ for i≠j. Then the Combined Log-Seismic Response (CLSR) filter is $$c = V \Lambda^{-1} U^T h_k. \quad (9)$$

In one embodiment, the petrophysical property logs are predicted using Equation (5). The prediction of the high-resolution petrophysical logs at location j is determined by solving for Equations (10), (11) and (12):

$$h_j' = A \Lambda^{-1} b \quad (10)$$

where $$A = L_j V \quad (11)$$

$$b = U^T h_k \quad (12)$$

A generalized inversion means eliminating some of the smallest singular values that cause instability, though solutions of different cutoff levels of the singular values may fit data equally well. (Aki and Richards, 1980). It is computationally efficient to construct a matrix D whose element at the m-th row and n-th column has the form $$d_{mn} = a_{nm} b_m / s_n \quad (13)$$

where $a_{nm}$ is an element of A, and $b_m$ is an element of b. A solution of $h_j'$ with up to p singular values is just a row-summation of the first p columns of the matrix D.

The instability problem in the convolution can be treated as the non-uniqueness problem in inversion, as manifested by the multiple solutions offered by the matrix D. Though the solution is non-unique, it is certainly stable. One method to choose a solution is to select the cutoff level of the singular value based on three constraints. First, the solution should give the best prediction at the $k_{th}$ location where the high-resolution log is given. Second, a low-pass filtered version of the prediction should correlate well with the low-resolution data everywhere. Finally, the ratio between magnitudes of the prediction and the low-resolution data may be chosen to be close to the ratio at the $k_{th}$ location with known high-resolution data.

EXAMPLE

Figure 2:
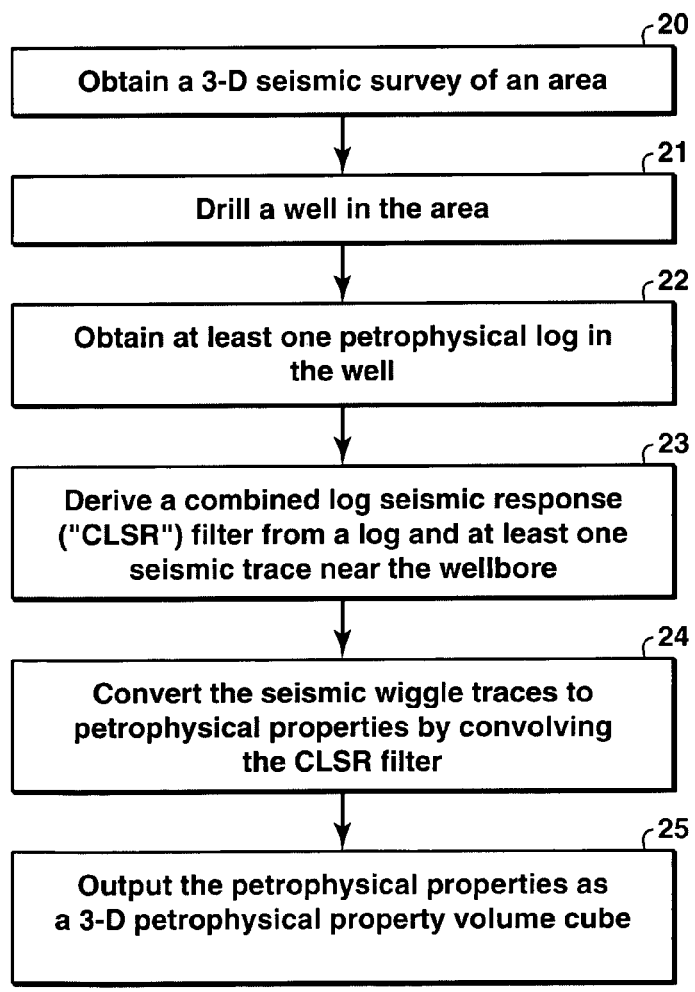
FIG. 2 is a flow chart of one embodiment of a method to convert a three-dimensional seismic survey and at least one petrophysical well log in the seismic survey to a petrophysical property cube.

FIG. 2 illustrates an embodiment of the method of producing three-dimensional petrophysical volume cubes using at least one well log and a three-dimensional seismic volume. A three-dimensional seismic survey of the area is obtained 20. A well is drilled in the area of the seismic area 21. Alternatively, an existing well or combination of wells located in the seismic area may be utilized. At least one petrophysical log is obtained from at least one well 22. A CLSR filter is derived from a petrophysical log and at least one seismic trace substantially near the well 23. The seismic wiggle traces from the seismic survey are then converted to petrophysical properties by convolving the CLSR filter 24. The petrophysical properties may then be outputted as a three-dimensional property volume cube 25.

Figure 3:
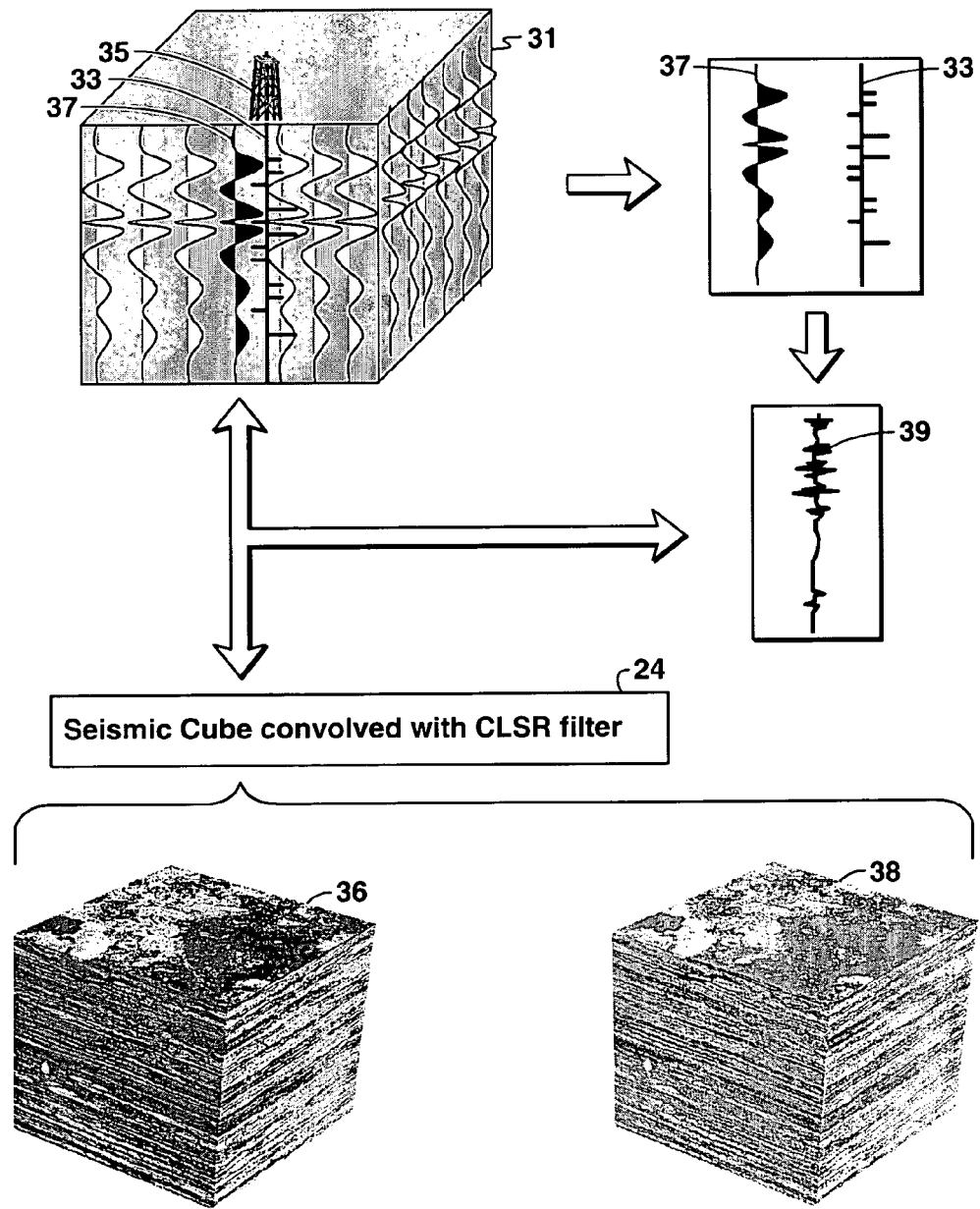
FIG. 3 is a graphical flow chart of an embodiment of the invention.

FIG. 3 illustrates one embodiment of the conceptual process of the three-dimensional petrophysical volume cubes using well logs and three-dimensional seismic volume. Within a three-dimensional seismic survey cube 31, a well 35 is drilled and high frequency log(s) 33 were run which may be converted in time domain, $h_{log}(t)$. Using a nearby seismic trace $l_{seis}(t)$ 37 and the well log $h_{log}(t)$ 33, a Combined Log and Seismic Response (CLSR) filter c(t) 39 can be obtained by solving Equation (4). Assuming that c(t) is invariant over the seismic survey, the high-resolution petrophysical property log response $h_j'(t)$ from every seismic trace, can be extrapolated (or predicted) 24 by solving Equation (5) to generate three-dimensional petrophysical property volume cubes (36 and 38) which have a much enhanced vertical resolution compared with the seismic data.

The petrophysical property data produced by this invention may include but are not limited to the following data: Gamma Ray, V-shale, porosity, density, net-to-gross, resistivity, hydrocarbon saturation, permeability, and any combination. In theory, any petrophysical property either as a two-dimensional log cross-section, or a three-dimensional log volume cube can be generated through the above process.

Figure 4A:
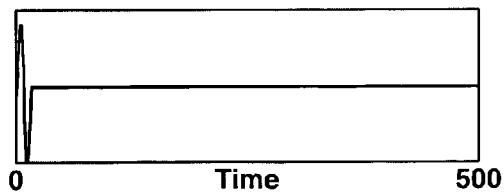
FIG. 4(A) is a high-resolution well log response function in time domain.
Figure 4B:
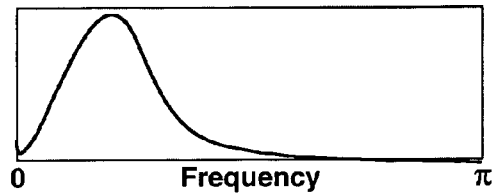
FIG. 4(B) is the frequency spectrum of the well log response function in FIG. 4(a)
Figure 4C:
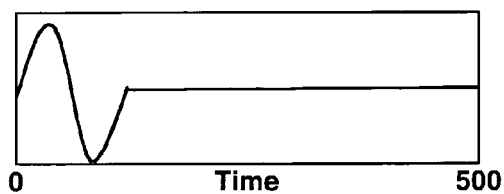
FIG. 4(C) is a low-resolution seismic wavelet.
Figure 4D:
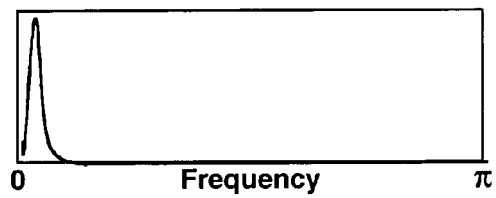
FIG. 4(D) is the frequency spectrum corresponding to the seismic wavelet in FIG. 4(C)
Figure 4E:
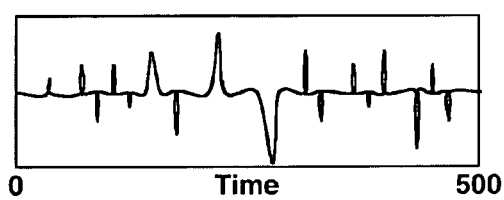
FIG. 4(E) is a high-resolution petrophysical log from a well.
Figure 4F:
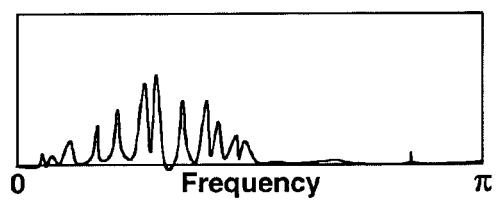
FIG. 4(F) is the frequency spectrum of the high frequency well log from FIG. 4(E)
Figure 4G:
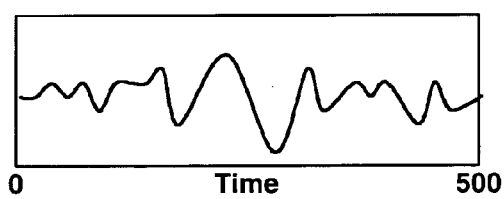
FIG. 4(G) is a low-resolution seismic trace near the borehole from which the well log in FIG. 4(E) was run.
Figure 4H:
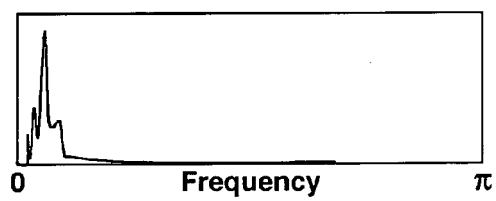
FIG. 4(I) is the Combined Log-Seismic Response (CLSR) from the seismic trace of FIG. 4(G) and the well log of FIG. 4(E)
FIG. 4(J) is the frequency spectrum of the Combined Log-Seismic Response (CLSR) of FIG. 4(I)
FIG. 4(K) is the predicted high-resolution petrophysical log obtained by convolving the CLSR of FIG. 4(I) with the low-resolution seismic trace of FIG. 4(G)
FIG. 4(L) is the frequency spectrum of the predicted high frequency log of FIG. 4(K).
Figure 4I:
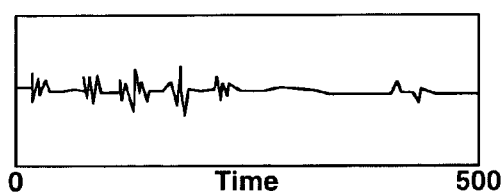
Figure 4J:
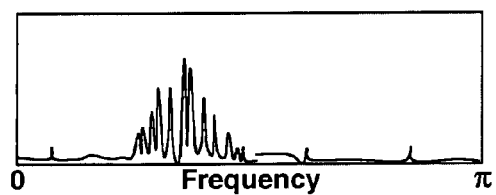
Figure 4K:
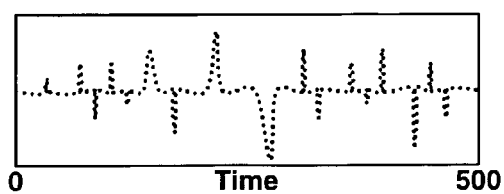
Figure 4L:
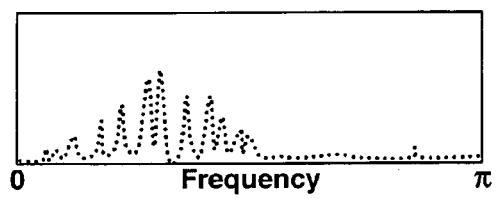

FIGS. 4(A) through 4(L) shows an experiment of the method that first derives a CLSR filter with a high-resolution log and then a low-resolution seismic trace, then second predicts the given high-resolution log with the CLSR filter and low-resolution seismic trace. FIGS. 4(A) and 4(B) are the high-frequency log response function and its frequency spectrums, respectively. FIGS. 4(C) and 4(D) are the low-frequency seismic wavelet and its frequency spectrums, respectively. FIGS. 4(E) and 4(F) are high-frequency log from a well and its frequency spectrums, respectively. FIGS. 4(G) and 4(H) are the low-frequency seismic trace near the well and its frequency spectrums, respectively. FIGS. 4(I) and 4(J) are the Combined Log-Seismic Response filter by solving Equation (4) or (9), and its frequency spectrums. FIGS. 4(K) and 4(L) are the predicted high-resolution log by solving Equation (5) or (10) and its frequency spectrums. Note that the predicted high resolution log and its spectrum in FIGS. 4(K) and 4(L) are almost identical to the original high-resolution log run from a well in FIGS. 4(E) and 4(F).

As shown in FIG. 4(H), the spectrum of the low-frequency seismic data is near zero when frequencies goes higher, and over which the high-frequency log data in FIG. 4(J) has significant amplitude in higher frequency. This means that it is unstable to do spectral division as in the discussion about derivation of Equation (3). The previous impossible task of spectral division is now solved using the constrained inversion for a stable log-seismic response filter c(t). This method provides a good prediction of the high-resolution log as shown in FIGS. 4(K) and 4(L) versus the original high-resolution log run from a well in FIGS. 4(E) and 4(F). The predicted high-resolution log has enhanced resolution and can be used for quantitative geological and geophysical analysis/interpretation, geological modeling, and reservoir simulation.

What is claimed is:

1. A method of converting seismic traces to petrophysical properties comprising:
   (a) deriving a combined log seismic response filter from at least one petrophysical log in a well and at least one seismic trace substantially near at least one well;
   (b) convolving the combined log seismic response filter to convert the seismic traces to at least one log of petrophysical properties;
   (c) outputting at least one log of petrophysical properties from step (b).

2. The method of claim 1 wherein the at least one log of petrophysical properties of step (d) is outputted as a two-dimensional cross-section.

3. The method of claim 1 wherein the seismic survey of step (a) is a two-dimensional seismic survey substantially near the well.

4. The method of claim 1 wherein the seismic survey of step (a) is a three-dimensional seismic survey of the area around the at least on well.

5. The method of claim 4 wherein the at least one log of petrophysical properties of step (d) is outputted as three-dimensional property volume cube.

6. The method of claim 1 wherein the petrophysical log from at least one well in step (a) is selected from the group comprising Gamma Ray, V-shale, porosity, density, net-to-gross, resistivity, hydrocarbon saturation, flow permeability, and any combination thereof.

7. The method of claim 1 wherein the at least one log of petrophysical properties of step (d) outputted is selected from the group consisting of Gamma Ray, V-shale, porosity, density, net-to-gross, resistivity, hydrocarbon saturation, flow permeability, and any combination thereof.

8. The method of claim 1 further comprising drilling a well in the three-dimensional seismic survey to obtain at least one petrophysical log of the well and using the petrophysical log in step (a).

9. The method of claim 1 wherein the combined log and seismic response is derived from the equation:

$$c(t)=h_{log}(t)_k * l_{seis}(t)_k^{-1}$$

wherein c(t) is the combined log and seismic response, $h_{log}(t)_k$ is the high frequency well log response at location k, and $l_{seis}(t)_k$ is the low frequency seismic response at location k.

10. A method of converting a three-dimensional seismic volume cube of an area to a three-dimensional petrophysical property volume cube comprising:
   (a) obtaining a three-dimensional seismic volume cube from a seismic survey of the area;
   (b) drilling a well in the area;
   (c) obtaining at least one petrophysical log from the well drilled in the area;
   (d) deriving a combined log seismic response (CLSR) filter from a log and at least one seismic trace near the well;
   (e) converting seismic wiggles traces to petrophysical properties by convolving the CLSR filter with each seismic trace;
   (f) Outputting the petrophysical properties as a three-dimensional property volume cube.

11. The method of claim 10 wherein the petrophysical log in step (c) is selected from the group consisting of gamma ray log, resistivity log, porosity log, density log, or sonic log and any combination thereof.

12. The method of claim 10 wherein the seismic traces are connected in all spatial locations.

13. The method of claim 10 wherein the petrophysical property volume cube outputted is selected from the group consisting of Gamma Ray, V-shale, porosity, density, net-to-gross, resistivity, hydrocarbon saturation, flow permeability, and any combination thereof.

14. The method of claim 1 wherein the combined log and seismic response is derived from the equation:

$$c(t)=h_{log}(t)_k * l_{seis}(t)_k^{-1}$$

wherein c(t) is the combined log and seismic response, $h_{log}(t)_k$ is the high frequency well log response at location k, and $l_{seis}(t)_k^{-1}$ is the low frequency seismic response at location k.

15. The method of claim 1, wherein steps (a) and (b) are performed in time domain.

* * * * *